(12) United States Patent
Dolce et al.

(10) Patent No.: US 12,160,548 B2
(45) Date of Patent: *Dec. 3, 2024

(54) SYSTEM AND METHOD FOR RECOMMENDING AND/OR SELECTING MEDIA FOR PRINTING A DIGITAL IMAGE

(71) Applicant: FUJIFILM North America Corporation, Valhalla, NY (US)

(72) Inventors: James Dolce, Rochester, NY (US); James Riekert, Yorktown Heights, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,689

(22) Filed: Apr. 21, 2023

(65) Prior Publication Data

US 2023/0254418 A1     Aug. 10, 2023

Related U.S. Application Data

(63) Continuation of application No. 17/582,377, filed on Jan. 24, 2022, now Pat. No. 11,700,337, which is a continuation of application No. 16/743,715, filed on Jan. 15, 2020, now Pat. No. 11,233,910, which is a continuation of application No. 16/213,125, filed on Dec. 7, 2018, now Pat. No. 10,567,597.

(60) Provisional application No. 62/627,901, filed on Feb. 8, 2018.

(51) Int. Cl.
    *H04N 1/00*      (2006.01)

(52) U.S. Cl.
    CPC ..... *H04N 1/00183* (2013.01); *H04N 1/00175* (2013.01); *H04N 1/00177* (2013.01); *H04N 1/00336* (2013.01)

(58) Field of Classification Search
    CPC .......... H04N 1/00183; H04N 1/00175; H04N 1/00177; H04N 1/00336
    USPC ....................................... 358/448, 1.9, 1.15
    See application file for complete search history.

(56) References Cited

U.S. PATENT DOCUMENTS

| | | |
|---|---|---|
| 9,172,828 B2 | 10/2015 | Kano et al. |
| 10,567,597 B2 | 2/2020 | Dolce et al. |
| 11,233,910 B2 * | 1/2022 | Dolce ................ H04N 1/00336 |
| 2011/0242561 A1 | 10/2011 | Nitta |

\* cited by examiner

*Primary Examiner* — Quang N Vo
(74) *Attorney, Agent, or Firm* — Woods Oviatt Gilman LLP; Dennis B. Danella, Esq.

(57) ABSTRACT

A computer-implemented method programmed for execution in a computing environment for recommending at least one size and type of substrate to be used in conjunction with a digital image to form a print product includes: providing a digital image; providing a list of available substrates stored in a memory; utilizing a processor, analyzing the digital image to identify image content included in the digital image; utilizing the processor, automatically selecting at least one size of substrate to be used to form a print product based on the identified image content; automatically identifying at least one type of substrate from the list of available substrates utilizing the processor based on at least one of the selected at least one size of substrate or the identified image content; and displaying the identified at least one type of substrate and the selected at least one size of substrate on a display.

28 Claims, 6 Drawing Sheets

SYSTEM AND METHOD FOR RECOMMENDING AND/OR SELECTING MEDIA FOR PRINTING A DIGITAL IMAGE

CROSS-REFERENCE TO RELATED APPLICATIONS

This application is a continuation of U.S. patent application Ser. No. 17/582,377 filed Jan. 24, 2022, which is a continuation of U.S. patent application Ser. No. 16/743,715 filed Jan. 15, 2020, now U.S. Pat. No. 11,233,910, which is a continuation of U.S. patent application Ser. No. 16/213,125 filed Dec. 7, 2018, now U.S. Pat. No. 10,567,597, which claims the benefit of U.S. Patent Application No. 62/627,901 filed Feb. 8, 2018, the contents of which are incorporated by reference in their entirety.

FIELD OF THE INVENTION

The present invention is directed to a system and method for recommending and/or selecting a substrate or media for printing a digital image; in particular, the present invention is configured to utilize at least one of image content or image characteristics of the digital image to recommend and/or select a substrate or media for printing the digital image to form a print product; and more particularly, the substrate recommendation may be refined based on a target size for the substrate and/or a display location for the print product.

BACKGROUND OF THE INVENTION

The production of print products continues to enjoy a significant demand despite the various devices that are available today for people to electronically view and enjoy digital images. There are many different types of computer-based platforms, such as photo kiosks, websites, and mobile applications, that make it convenient for a consumer to obtain a print product. These platforms facilitate the process of obtaining a print product by allowing the consumer to upload a digital image, select a physical substrate or media for the print product, and designate a delivery method using the respective computing device.

During this process, the consumer is presented with a number of different types of substrates that the digital image can be printed on. As the number and types of substrates for printing digital images expands, consumers do not always know the best or preferred substrates to use for printing a digital image. Today there are a wide range of consumer and professional grade photographic paper substrates that can be used for printing digital images to for a print product. There are also a number of non-paper based substrates, such as metal, acrylic, and wood, which can be used for printing digital images to form print products. Most consumers do not have a good understanding of what substrates will work best for a given digital image. This may result in a consumer selecting a substrate that may not be appropriate for a given digital image, thereby resulting in the production of a print product may not be acceptable to the consumer due to the poor reproduction of the digital image on the substrate.

Accordingly there is a need for a system and method for recommending and/or selecting a substrate for printing a digital image to form a print product. The present invention fills these needs as well as other needs.

SUMMARY OF THE INVENTION

In one aspect, the present invention includes a computer-implemented method programmed for execution in a computing environment for recommending at least one size and type of substrate to be used in conjunction with a digital image to form a print product, the method comprising: a) providing a digital image; b) providing a list of available substrates stored in a memory; c) utilizing a processor, analyzing the digital image to identify image content included in the digital image; d) utilizing the processor, automatically selecting at least one size of substrate to be used to form a print product based on the identified image content; e) automatically identifying at least one type of substrate from the list of available substrates utilizing the processor based on at least one of the selected at least one size of substrate or the identified image content; and f) displaying the identified at least one type of substrate and the selected at least one size of substrate on a display.

In a second aspect, the present invention includes a computer system for recommending at least one size and type of substrate to be used in conjunction with a digital image to form a print product, the system comprising: a) a computer memory having a substrate recommender module and a list of available substrates stored therein; b) a processor configured for being used in conjunction with the substrate recommender module to: (i) analyze a digital image to identify image content included in the digital image; (ii) automatically select at least one size of substrate to be used to form a print product based on the identified image content; and (iii) automatically identify at least one type of substrate from the list of available substrates based on at least one of the selected at least one size of substrate or the identified image content; and c) a user interface configured for displaying the identified at least one type of substrate and the selected at least one size of substrate.

In a third aspect, the present invention includes a non-transitory computer readable medium having thereon computer executable instructions for execution in a computing environment for a method of recommending at least one size and type of substrate to be used in conjunction with a digital image to form a print product, the method comprising: a) providing a digital image; b) providing a list of available substrates stored in a memory; c) utilizing a processor, analyzing the digital image to identify image content included in the digital image; d) utilizing the processor, automatically selecting at least one size of substrate to be used to form a print product based on the identified image content; e) automatically identifying at least one type of substrate from the list of available substrates utilizing the processor based on at least one of the selected at least one size of substrate or the identified image content; and f) displaying the identified at least one type of substrate and the selected at least one size of substrate on a display.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Generally, the systems and methods described herein for recommending at least one substrate to be used in conjunction with a digital image to form a print product may be implemented in hardware, software or a combination thereof, and may be distributed across a variety of computing devices.

This document is organized as follows. In the first section, an overview of the techniques and implementation is provided and described with reference to some component devices and embodiments of the invention. In the next section, an exemplary algorithm for providing a base scoring aspect of the present invention is discussed. Following this, an exemplary computer environment for the implementation and use of the invention is described.

In general, the present invention provides a computer-implemented method programmed for execution in a computing environment for recommending at least one substrate to be used in conjunction with a digital image to form a print product. The computer-implemented method includes analyzing the digital image to identify image content and at least one image characteristic included in the digital image. At least one substrate from a list of available substrates is then automatically identified based on at least one of the identified image content or the identified at least one image characteristic. The identified at least one substrate is then displayed to the consumer so that the consumer can select one or more of the at least one identified at least one substrate for fulfillment to produce a print product including the digital image disposed on the selected at least one substrate. The method may further include selecting a size for the identified at least one substrate utilizing the processor based on at least one of the identified image content, the identified at least one image characteristic, or the identified at least one substrate. The method may also allow for the selection of a size for the print product by the consumer, wherein the automatic identification of the at least one substrate is further based on the selected size. Moreover, the method may allow for the selection of a display location for the print product by the consumer, wherein the automatic selection of the at least one substrate is further based on the display location. Other aspects of the method are described in more detail below.

Figure 1:
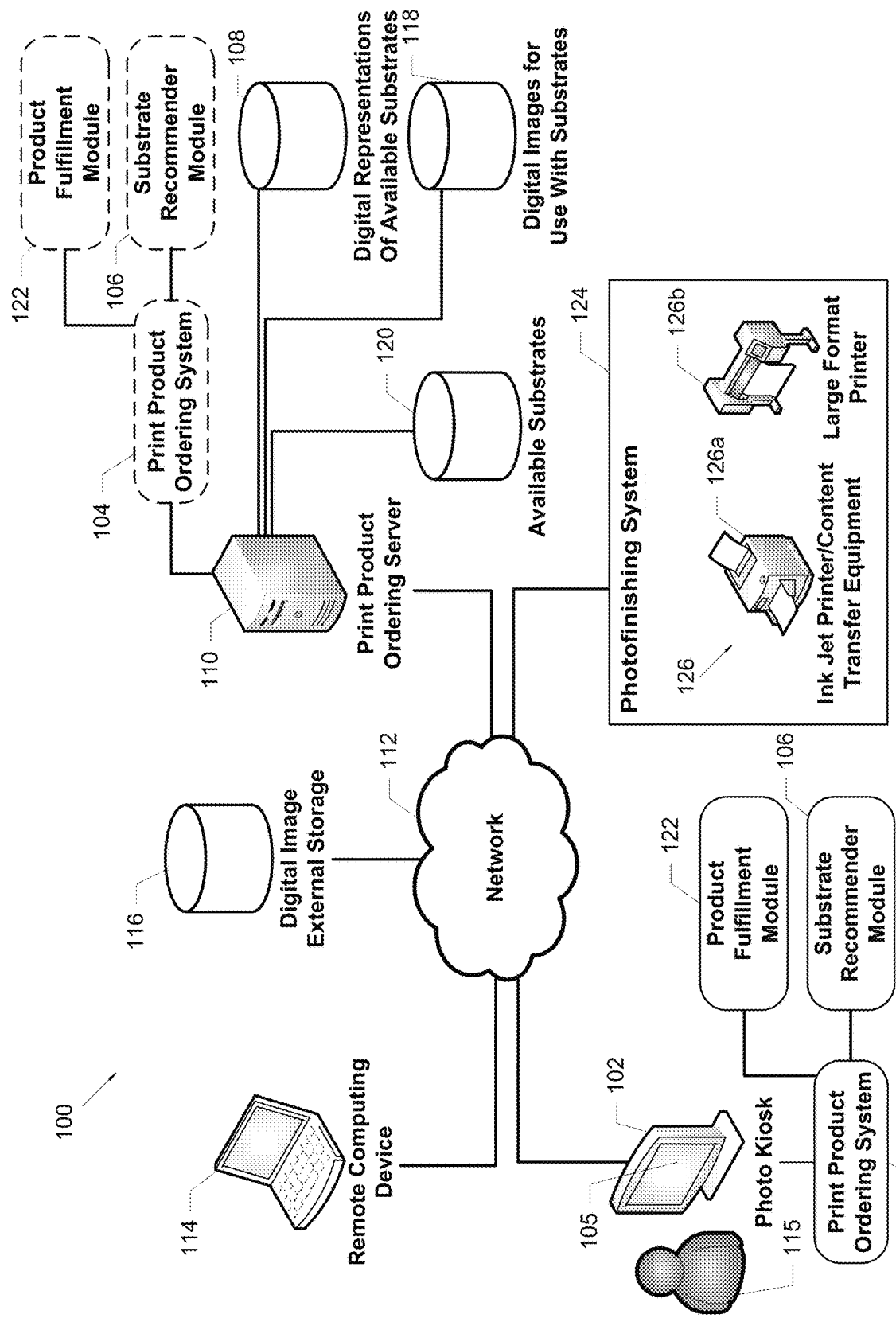
FIG. 1 is a block diagram generally illustrating various components that may be utilized for the implementation of some aspects of the present invention.

Referring to the drawings, and initially to FIG. 1, an exemplary system that may be used to implement the methods and aspects described herein is identified as reference number 100. System 100 may comprise one or more computing devices 102, such as a photo kiosk, mobile computing device or other type of computing device (hereinafter referred to as "kiosk 104" for exemplary purposes), that includes or has access to a print product ordering system 104. In accordance with an aspect of the present invention, print product ordering system 104 includes a substrate/media recommender module 106 (hereinafter "substrate recommender module") that uses computer-executable instructions in conjunction with a processor to automatically identify at least one substrate that may be used with a digital image to produce a print product, as will be described in more detail below. The available substrates that may be used to produce a print product, as well as digital representations of available substrates, may be stored in a memory 108, 120 of a server 110 that is communication with kiosk 102 through a network 112. Network 112 may be any type of network, such as a wide area network or local area network through a wired or wireless connection.

Print product ordering system 104 is configured to associate at least one digital image with the digital representations of the substrates to form digital representations of the resulting print products that are displayed on a user interface 105 of kiosk 102 for selection by a user 115. The association of the digital image and the digital representations of the substrates provides user 115 with a visual representation of how a digital image will look on a substrate if it were ordered and produced.

System 100 allows for the digital images to be transferred to kiosk 102 using an external memory device, such as a thumb drive or memory card, or uploaded or otherwise accessible from a remote computing device 114 through network 112, or uploaded or otherwise accessible from an external storage location 116, such as a social media website (e.g., INSTAGRAM® and IPHOTO®) or cloud-based memory location, using kiosk 102 or external computing device 114. Remote computing device 114 may be any type of computing device, such as, but not limited to, a desktop computer, smartphone, tablet, or other mobile computing device that is capable of transferring a digital image to kiosk 102. After the digital images are transferred to kiosk 102, the digital images may be stored locally in the memory of kiosk 102 or in a memory 118 in server 110.

Print product ordering system 104 may further include a product fulfillment module 122 that uses executable instructions to allow user 115 to request that a selected print product be produced by kiosk 102, or a photofinishing system 124 that is in communication with kiosk 102 over network 112. In particular, fulfillment module 122 communicates with one or more photofinishing devices 126 that are configured for producing the selected print product that disposes the provided digital image on the selected substrate. A print product can be any type of substrate that has the digital image printed or displayed thereon. The available substrates that may be used to form a print product each comprise a plurality of characteristics including at least one of a substrate material type, thickness, texture, or surface sheen. The substrate material type can be a paper or non-paper based substrate. The paper based substrates may include at least one of plain office paper, wet-processes photo paper, dye diffusion thermal transfer paper, swellable inkjet coated paper, porous inkjet coated paper, or fine art inkjet paper. The non-paper based substrates may include at least one of metal, acrylic, wood, cloth (clothing, blanket), ceramic (mug), and other materials (mouse pad, water bottles). Given the wide variety of substrates that may be used to produce print products, system 100 may include a plurality of different types of photofinishing devices capable of producing such consumer and professional grade print products utilizing the selected substrate, such as, for example, an ink jet printer/content transfer equipment 126a or a large format printer 126b for large items such as a poster. Photofinishing devices 126 may be physically located in a single physical location, such as a fulfillment center (e.g., retail/drug store) or in different physical locations, and may be in communication with each other through network 112.

It should be understood that print product ordering system 104, substrate recommender module 106 and product fulfillment module 122 may be stored in a memory of kiosk 102, and/or in server 110 that is in communication with kiosk 102 over network 112. Modules 106, 122 are not limited to any specific hardware or software configuration, but may rather be implemented as computer executable instructions in any computing or processing environment, including in digital electronic circuitry or in computer hardware, firmware, device driver, or software.

Figure 2:
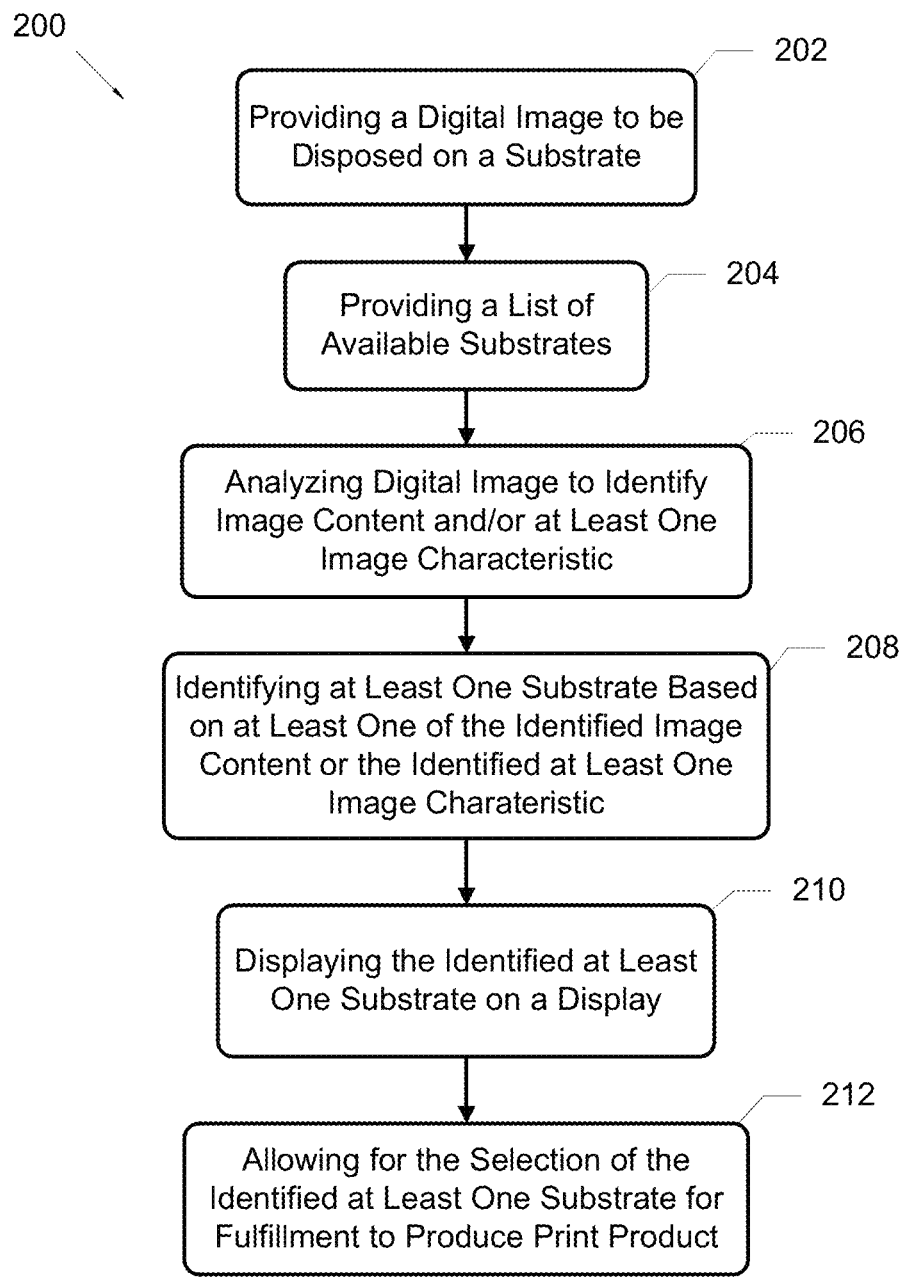
FIG. 2 is a flow chart illustrating a methodology for recommending and selecting a substrate to be used in conjunction with a digital image to produce a print product in accordance with one aspect of the present invention.

FIG. 2 is a flow diagram showing an exemplary method 200 that may be implemented using system 100 in accordance with one aspect of the present invention. In particular, as previously mentioned, method 200 is computer-implemented and programmed for execution in a computing environment for recommending at least one substrate to be used in conjunction with a digital image to form a print product. Method 200 comprises a step 202 of providing at least one digital image to print product ordering system 104, which may be disposed on a substrate to form the print product. The digital image may be provided to print product ordering system 104 in any number of ways. For example, a digital image may be uploaded from a thumb drive, a memory card, or from a mobile computing device to kiosk 102 and/or memory 118 of print product ordering server 110 by a user 115 over network 112. In another example, remote computing device 114 may be used to transfer the digital image to kiosk 102 or server 110 for use by print product ordering system 104. In yet another example, the digital image may be obtained from a social media website, such as external storage 116, over network 112.

At step 204, the method includes providing a list of available substrates in a memory 120, wherein the list of available substrates includes those substrates that photofinishing devices 126 are capable of disposing the digital image thereon. In other words, each of photofinishing devices 126 has certain capabilities for printing a digital image on certain types of substrates. One photofinishing device may be capable of printing digital images on wood, while another photofinishing device may only be capable of printing a digital image on a certain type of paper. Only those substrates that are capable of being printed by the photofinishing devices 126 are represented in memory 120.

At step 206, the method includes using substrate recommender module 106 to analyze the digital image to identify image content and/or at least one image characteristic included in the digital image. The image content may include at least one of an object, a person, or a scene depicted in the digital image, and the at least one image characteristic may include at least one of colors, density, saturation, resolution, hue, tint, shade, tone, chromaticity, intensity, lightness, luminosity, brightness, or greyscale.

At step 208, the method includes using substrate recommender module 106 to identify at least one substrate from the list of available substrates, utilizing the processor of kiosk 102 or server 110, based on at least one of the identified image content or the identified at least one image characteristic. Substrate recommender module 106 may use a design intelligence or knowledge-based correlation algorithm to make appropriate substrate recommendations in relation to the attributes of a digital image. Over time, knowledge is acquired relating to which substrates work the best with different types of digital images, which can be utilized to provide useful recommendations to user 115. For instance, if a digital image is analyzed and it is concluded that the digital image contains a face of one person with a dark blue or black background, then it may be determined that the digital image is a portrait and therefore recommend a paper based substrate, such as wet-process photo paper. In another example, if a digital image is analyzed and it is concluded that the digital image contains a beach scene, then it may be determined that the digital image relates to a family/friend memory and therefore recommend a non-paper based substrate, such as wood. It should be understood that the above-referenced identification of the at least one substrate may be done automatically by substrate recommender module 106.

At step 210, the method includes displaying the identified at least one substrate on a display of a user interface of kiosk 102. The display of the identified at least one substrate allows user 115 the opportunity to evaluate the substrate recommendation(s) that were made and make a determination as to whether the recommended at least one substrate is acceptable to user 115. It should be understood that this step may include either displaying to user 115 just the at least one substrate that was recommended, or digitally overlaying the digital image that was provided on top of the recommended at least one substrate so that user 115 can see a digital representation of the print product before user 115 decides whether to complete a print order for fulfillment.

At step 212, the method includes allowing for the selection of the identified at least one substrate by user 115 for fulfillment. Product fulfillment module 122 operates to associate the digital image with the substrate selected by user 115 to generate a print order and send the print order to a photofinishing device that is capable of printing the digital image on the selected substrate. The print order may be handled directly by kiosk 102 to produce the print product if kiosk 102 has the appropriate type of photofinishing device to handle the selected substrate. The print order may also be communicated to photofinishing system 124 over network 112 to produce the print product.

Figure 3:
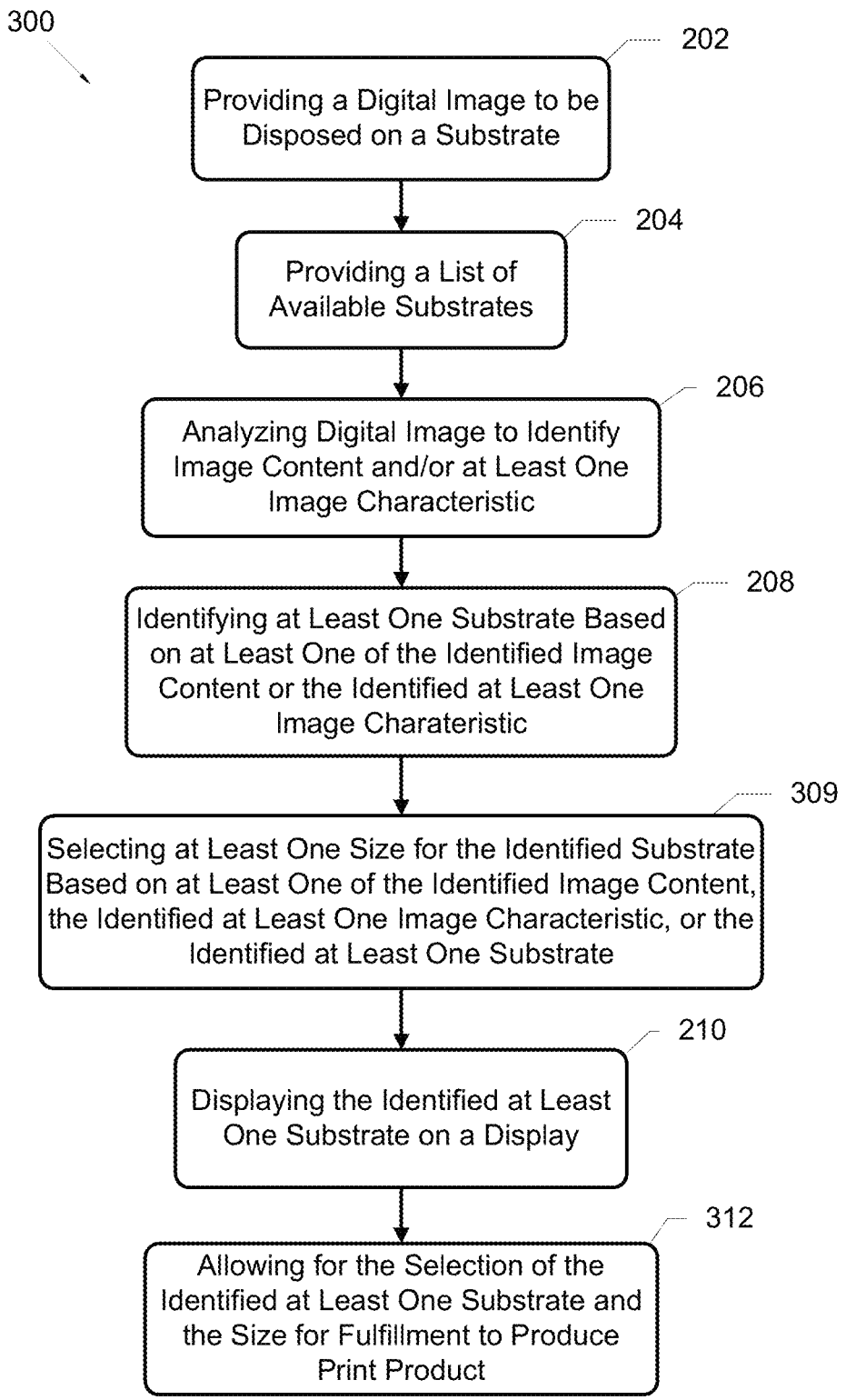
FIG. 3 is a flow chart illustrating an alternative methodology including aspects from the method set forth in FIG. 2.

FIG. 3 is a flow diagram showing an alternative method 300 in accordance with another aspect of the present invention. It should be understood that a number of steps included in the alternative methods set forth below are similar to those set forth in method 200, and it should be understood that a description of such steps provided above with respect to method 200 will also apply to the alternative methods set forth below. In general, method 300 may be used to recommend both a size and a substrate for a print product including the digital image. A size of a substrate may, for example, be the outer dimensions of a substrate (e.g., length and width). In one aspect, after steps 202-208, method 300 may further include utilizing substrate recommender module 106 to select a size for the identified at least one substrate utilizing the processor based on at least one of the identified image content, the identified at least one image characteristic, or the identified at least one substrate, at step 309. For example, if substrate recommender module 106 analyzes the digital image at step 206 and determines that a certain number of people are included in a digital image (e.g., eight people), then method 300 may include the step of recommending that a minimum size substrate be used (10×12) so that all of the people in the digital image are of a sufficient size in the print product. This will avoid a situation where a smaller sized substrate is used and it is difficult to see the people in the digital photograph. In another example, if substrate recommender module 106 identifies that a non-paper substrate, such as metal, should be used for a provided digital image in step 208, then step 309 may further recommend that a certain minimum size substrate be used for the print product. Method may thereafter proceed to step 210, and then to step 312 to allow for the selection of the identified at least one substrate and the size for fulfillment to produce the print product.

Figure 4:
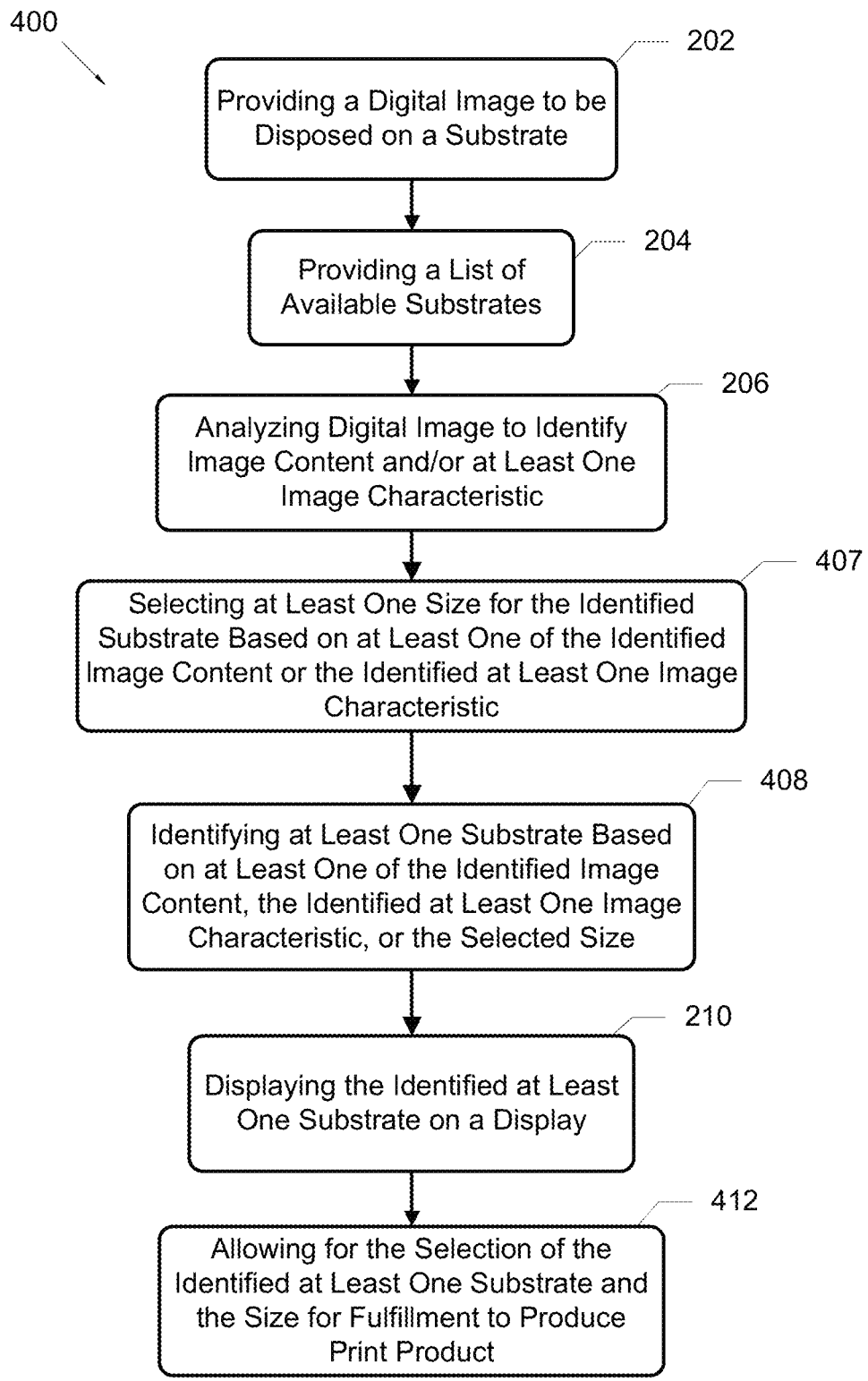
FIG. 4 is a flow chart illustrating another alternative methodology including aspects from the method set forth in FIG. 3.

It should also be understood that method 300 may also include performing step 309 prior to step 208. This alternative arrangement of steps is illustrated in the method 400 set forth in FIG. 4. As best seen in method 400, after the image content and/or at least one image characteristic of a provided digital image is determined in step 206, substrate recommender module 106 may select or recommend at least one size of a substrate (i.e., substrate size) be used for a print product in step 407. Method 400 may then proceed to step 408 to identify at least one substrate based on at least one of the identified image content, the identified at least one image characteristic, or the selected/recommended at least one substrate size. For example, substrate recommender module 106 may recommend a specific paper substrate for sizes 8×10 and less, and recommend a metal substrate for sizes greater than 10×12. Method 400 thereafter includes step 412 of allowing for the selection of the identified at least one substrate and the size for fulfillment of the print product.

Figure 5:
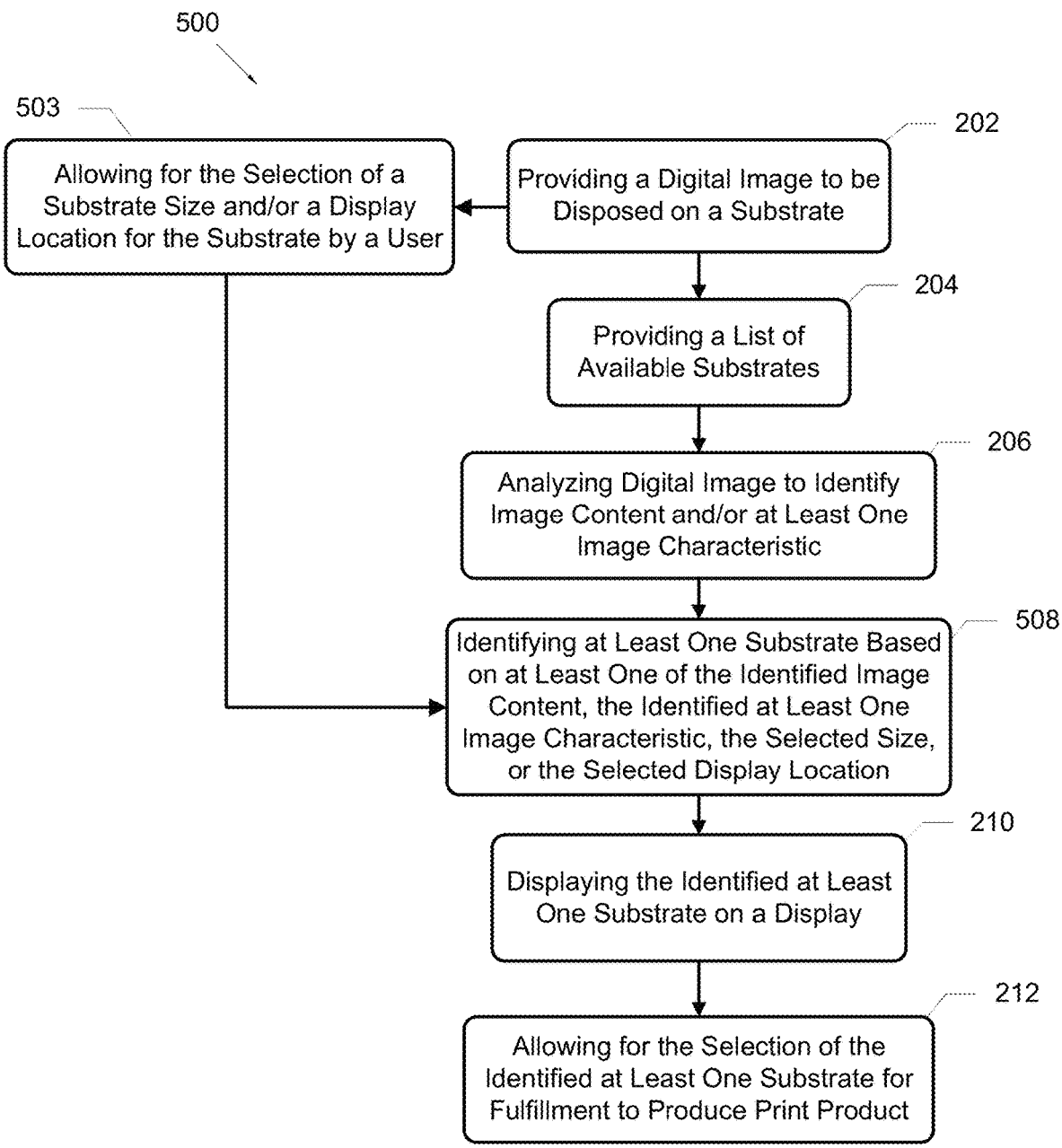
FIG. 5 is a flow chart illustrating yet another alternative methodology including aspects from the method set forth in FIG. 2.

FIG. 5 is a flow diagram showing yet another alternative method 500 in accordance with another aspect of the present invention. After the digital image is provided in step 202, method 500 further includes the ability to allow user 115 to select a size and/or a display location for the print product using print ordering system 104, at step 503. Once the size and/or a display location for the substrate is selected by user 115 at step 502, and steps 204 and 206 are completed, then substrate recommender module 106 proceeds to identify at least one substrate based on at least one of the identified image content or the identified at least one image characteristic. Method 500 further allows for the further refining of substrate(s) by taking into consideration the size and/or the display location selected by user 115, at step 508. For example, a digital image to be incorporated in a 8×10 size print product will receive a different substrate recommendation than a digital image being printed on a 16×20 size print product. Further, a stylized black and white digital image to be displayed in an office environment could receive a different substrate recommendation than a digital image including a family to be displayed on a living room wall.

In another aspect, it should be understood that the methods set forth above may be embodied in computer readable instructions stored on a non-transitory computer readable medium.

Having described the system and method of the present invention and an embodiment thereof, an exemplary computer environment for implementing the described design and execution is presented next.

Figure 6:
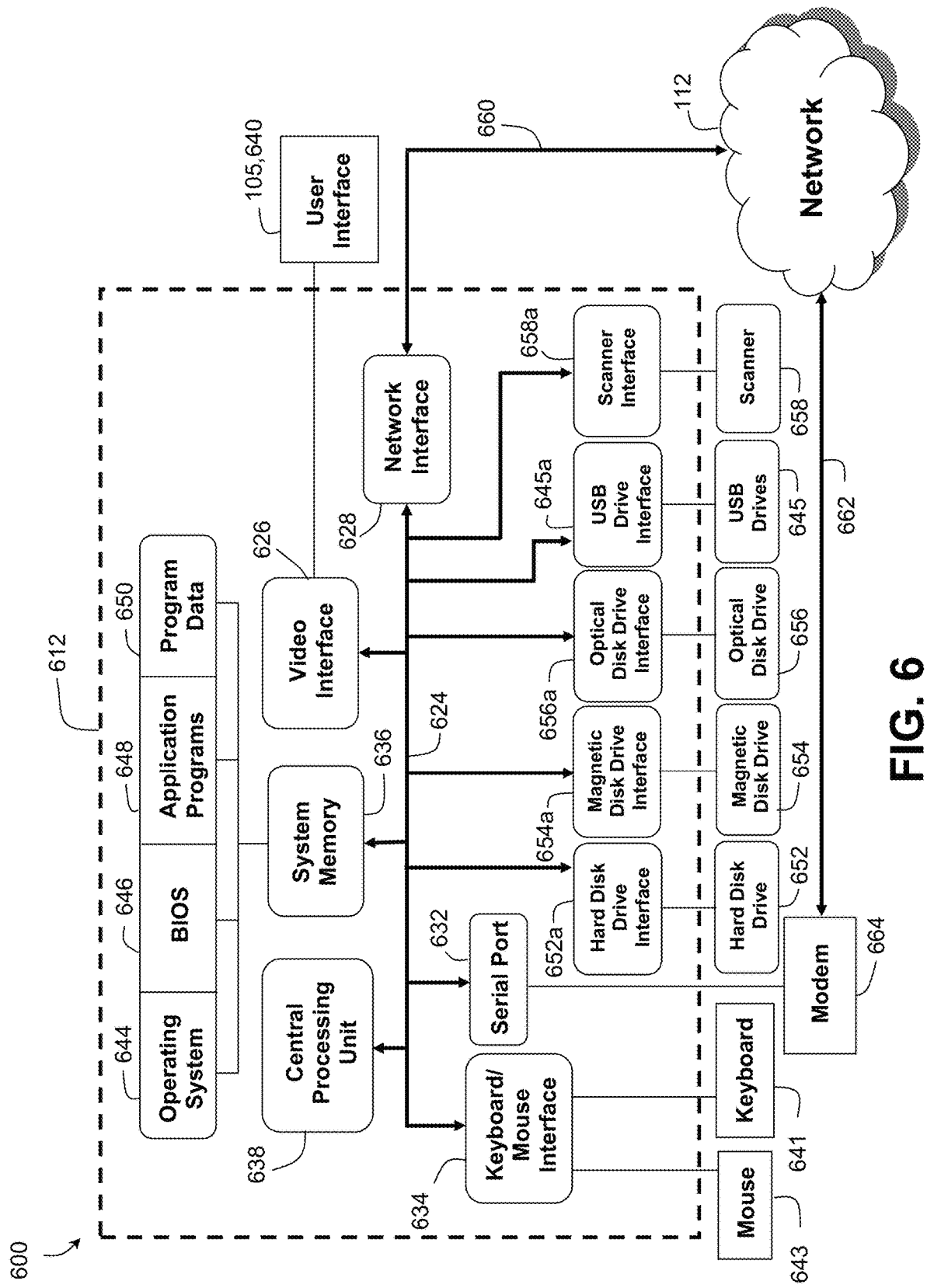
FIG. 6 is a block diagram generally illustrating a computing environment in which the invention may be implemented.

FIG. 6 shows an exemplary computing environment 600 that can be used to implement any of the processing thus far described. Computing environment 600 may include one or more computers 612 (such as computing device 102, server 110, remote computing device 114, photofinisher 126) comprising a system bus 624 that couples a video interface 626, network interface 628, a keyboard/mouse interface 634, and a system memory 636 to a Central Processing Unit (CPU) 638. A monitor or display 640 is connected to bus 624 by video interface 626 and provides the user with a graphical user interface to view, edit, and prepare a print order using digital images, including the selection of an identified substrate, or the selection a size and/or display location for a print product. The graphical user interface allows the user to enter commands and information into computer 612 using a keyboard 641 and a user interface selection device 643, such as a mouse, touch screen, or other pointing device. Keyboard 641 and user interface selection device are connected to bus 624 through keyboard/mouse interface 634. The display 640 and user interface selection device 643 are used in combination to form the graphical user interface which allows the user to implement at least a portion of the present invention. Other peripheral devices may be connected to the remote computer through universal serial bus (USB) drives 645 to transfer information to and from computer 612. For example, cameras and camcorders may be connected to computer 612 through serial port 632 or USB drives 645 so that data representative of a digital image or video may be downloaded to system memory 636 or another memory storage device associated with computer 612 such that the digital images may be subsequently printed on a substrate by one or more photofinishing devices 126.

The system memory 636 is also connected to bus 624 and may include read only memory (ROM), random access memory (RAM), an operating system 644, a basic input/output system (BIOS) 646, application programs 648 and program data 650. The computer 612 may further include a hard disk drive 652 for reading from and writing to a hard disk, a magnetic disk drive 654 for reading from and writing to a removable magnetic disk (e.g., floppy disk), and an optical disk drive 656 for reading from and writing to a removable optical disk (e.g., CD ROM or other optical media). The computer 612 may also include USB drives 645 and other types of drives for reading from and writing to flash memory devices (e.g., compact flash, memory stick/PRO and DUO, SD card, multimedia card, smart media xD card), and a scanner 658 for scanning items such as digital images to be downloaded to computer 612. A hard disk drive interface 652a, magnetic disk drive interface 654a, an optical drive interface 656a, a USB drive interface 645a, and a scanner interface 658a operate to connect bus 624 to hard disk drive 652, magnetic disk drive 654, optical disk drive 656, USB drive 645 and scanner 658, respectively. Each of these drive components and their associated computer-readable media may provide computer 612 with non-volatile storage of computer-readable instruction, program modules, data structures, application programs, an operating system, and other data for computer 612. In addition, it will be understood that computer 612 may also utilize other types of computer-readable media in addition to those types set forth herein, such as digital video disks, random access memory, read only memory, other types of flash memory cards, magnetic cassettes, and the like.

Computer 612 may operate in a networked environment using logical connections with each of the system components described above. Network interface 628 provides a communication path 660 between bus 624 and network 112, which allows, for example, a print order, digital image, and the identified and selected substrate to be communicated through network 112 from kiosk 102 to photofinishers 126 after the print order has been established, and optionally saved in a memory. This type of logical network connection is commonly used in conjunction with a local area network (LAN). The print order, digital image, and the identified and selected substrate may also be communicated from bus 624 through a communication path 662 to network 112 using serial port 632 and a modem 664. Using a modem connection between the computer 612 and the other components of system 100 is commonly used in conjunction with a wide area network (WAN). It will be appreciated that the network connections shown herein are merely exemplary, and it is within the scope of the present invention to use other types of network connections between computer 612 and the other components of system 100 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A computer-implemented method programmed for execution in a computing environment for recommending at least one size and type of substrate to be used in conjunction with a digital image to form a print product, the method comprising:
   a) providing a digital image;
   b) providing a list of available substrates stored in a memory;
   c) utilizing a processor, analyzing the digital image to identify image content included in the digital image;
   d) utilizing the processor, automatically selecting at least one size of substrate to be used to form a print product based on the identified image content;
   e) automatically identifying at least one type of substrate from the list of available substrates utilizing the processor based on the identified image content; and
   f) displaying the identified at least one type of substrate and the selected at least one size of substrate on a display.

2. The method of claim 1, further comprising the step of:
   g) allowing for a selection of the identified at least one type of substrate and the selected at least one size of substrate for fulfillment to produce the print product including the digital image disposed on the selected at least one size and type of substrate.

3. The method of claim 1, wherein the step of providing a digital image includes receiving the digital image from a remote computing device over a network.

4. The method of claim 1, wherein the step of providing the digital image includes receiving the digital image from an external memory storage device.

5. The method of claim 4, wherein the external memory storage device includes a thumb drive, a memory card, or a memory of a mobile computing device.

6. The method of claim 1, wherein the identified image content includes at least one of an object, a person, or a scene depicted in the digital image.

7. The method of claim 1, wherein each of the substrates included in the list of available substrates include a plurality of characteristics, wherein the plurality of characteristics includes a substrate material type, thickness, texture, or surface sheen.

8. The method of claim 7, wherein the substrate material type includes a paper based substrate.

9. The method of claim 8, wherein the paper based substrate includes at least one of plain office paper, wet-processes photo paper, dye diffusion thermal transfer paper, swellable inkjet coated paper, porous inkjet coated paper, or fine art inkjet paper.

10. The method of claim 7, wherein the substrate material type includes a non-paper based substrate.

11. The method of claim 10, wherein the non-paper based substrate includes at least one of metal, acrylic, or wood.

12. The method of claim 1, wherein the selected at least one size of substrate is a length and a width thereof.

13. The method of claim 1, further comprising the step of allowing for a selection of a display location for the print product, wherein the step of automatically identifying the at least one type of substrate is further based on the display location.

14. A computer system for recommending at least one size and type of substrate to be used in conjunction with a digital image to form a print product, the computer system comprising:
   a) a computer memory having a substrate recommender module and a list of available substrates stored therein;
   b) a processor configured for being used in conjunction with the substrate recommender module to:
      (i) analyze a digital image to identify image content included in the digital image;
      (ii) automatically select at least one size of substrate to be used to form a print product based on the identified image content; and
      (iii) automatically identify at least one type of substrate from the list of available substrates based on the identified image content; and
   c) a user interface configured for displaying the identified at least one type of substrate and the selected at least one size of substrate.

15. The computer system of claim 14, wherein the user interface is configured to allow for the selection of the identified at least one type of substrate and the selected at least one size of substrate for fulfillment to produce the print product including the digital image disposed on the selected at least one size and type of substrate.

16. The computer system of claim 14, wherein the identified image content includes at least one of an object, a person, or a scene depicted in the digital image.

17. The computer system of claim 14, wherein each of the substrates included in the list of available substrates include a plurality of characteristics, wherein the plurality of characteristics includes a substrate material type, thickness, texture, or surface sheen.

18. The computer system of claim 17, wherein the substrate material type includes a paper based substrate or a non-paper based substrate.

19. The computer system of claim 14, wherein the selected at least one size of substrate is a length and a width thereof.

20. The computer of claim 14, wherein the user interface is configured for allowing for a selection of a display location for the print product, wherein the automatic identification of the at least one type of substrate is further based on the display location.

21. A non-transitory computer readable medium having thereon computer executable instructions for execution in a computing environment for a method of recommending at least one size and type of substrate to be used in conjunction with a digital image to form a print product, the method comprising:
   a) providing a digital image;
   b) providing a list of available substrates stored in a memory;
   c) utilizing a processor, analyzing the digital image to identify image content included in the digital image;
   d) utilizing the processor, automatically selecting at least one size of substrate to be used to form a print product based on the identified image content;
   e) automatically identifying at least one type of substrate from the list of available substrates utilizing the processor based on the identified image content; and
   f) displaying the identified at least one type of substrate and the selected at least one size of substrate on a display.

22. The non-transitory computer readable medium of claim 21, wherein the method further comprises the step of:
   g) allowing for a selection of the identified at least one type of substrate and the selected at least one size of substrate for fulfillment to produce the print product including the digital image disposed on the selected at least one size and type of substrate.

23. The non-transitory computer readable medium of claim 21, wherein the step of providing a digital image includes receiving the digital image from a remote computing device over a network or an external memory storage device.

24. The non-transitory computer readable medium of claim 21, wherein the identified image content includes at least one of an object, a person, or a scene depicted in the digital image.

25. The non-transitory computer readable medium of claim 21, wherein each of the substrates included in the list of available substrates include a plurality of characteristics, wherein the plurality of characteristics includes a substrate material type, thickness, texture, or surface sheen.

26. The non-transitory computer readable medium of claim 25, wherein the substrate material type includes a paper based substrate or a non-paper based substrate.

27. The non-transitory computer readable medium of claim 21, wherein the selected at least one size of substrate is a length and a width thereof.

28. The non-transitory computer readable medium of claim 21, further comprising the step of allowing for a selection of a display location for the print product, wherein the step of automatically identifying the at least one type of substrate is further based on the display location.

* * * * *